United States Patent
Atanasov et al.

(10) Patent No.: US 11,915,065 B2
(45) Date of Patent: Feb. 27, 2024

(54) BROKERLESS RELIABLE TOTALLY ORDERED MANY-TO-MANY INTERPROCESS COMMUNICATION ON A SINGLE NODE THAT USES SHARED MEMORY AND MULTICAST

(71) Applicant: VMware LLC, Palo Alto, CA (US)

(72) Inventors: Rusko Atanasov, Sofia (BG); Kalin Tsvetkov, Sofia (BG)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/580,418

(22) Filed: Jan. 20, 2022

(65) Prior Publication Data
US 2023/0244556 A1    Aug. 3, 2023

(51) Int. Cl.
*G06F 9/54*    (2006.01)
*G06F 9/52*    (2006.01)

(52) U.S. Cl.
CPC .............. *G06F 9/544* (2013.01); *G06F 9/526* (2013.01); *G06F 9/546* (2013.01)

(58) Field of Classification Search
CPC ........... G06F 9/544; G06F 9/526; G06F 9/546
See application file for complete search history.

(56) References Cited

U.S. PATENT DOCUMENTS

| | | | | |
|---|---|---|---|---|
| 2002/0184373 | A1* | 12/2002 | Maes | H04L 65/70 704/E15.047 |
| 2003/0191793 | A1* | 10/2003 | Dolin, Jr. | H04L 67/10 718/103 |
| 2004/0181522 | A1* | 9/2004 | Jardin | G06F 16/27 |
| 2004/0181523 | A1* | 9/2004 | Jardin | G06F 16/2456 |
| 2004/0230972 | A1* | 11/2004 | Donovan | G06F 9/544 718/1 |
| 2008/0189282 | A1* | 8/2008 | Molnar | G06F 9/526 |
| 2008/0266302 | A1* | 10/2008 | Andre | G06F 13/4234 345/519 |
| 2009/0147704 | A1 | 6/2009 | Moore | |
| 2009/0235262 | A1* | 9/2009 | Ceze | G06F 9/52 717/124 |
| 2010/0299485 | A1* | 11/2010 | Karlapalem | G06F 12/0831 711/141 |
| 2011/0106986 | A1* | 5/2011 | Wilkinson | H04L 49/35 710/240 |
| 2013/0262783 | A1* | 10/2013 | Okada | G06F 9/546 711/147 |
| 2014/0105305 | A1* | 4/2014 | Young | H04N 5/145 348/E5.065 |

(Continued)

*Primary Examiner* — Tuan C Dao
(74) *Attorney, Agent, or Firm* — King Intellectual Asset Management (57) ABSTRACT

Examples described herein include systems and methods for brokerless reliable totally ordered many-to-many inter-process communication on a single node. A messaging protocol is provided that utilizes shared memory for one of the control plane and data plane, and multicast for the other plane. Readers and writers can store either control messages or message data in the shared memory, including in a ring buffer. Write access to portions of the shared memory can be controlled by a robust futex, which includes a locking mechanism that is crash recoverable. In general, the writers and readers can control the pace of communications and the crash of any process does not crash the overall messaging on the node.

17 Claims, 6 Drawing Sheets

(56) References Cited

U.S. PATENT DOCUMENTS

| | | | |
|---|---|---|---|
| 2015/0095613 A1 | 4/2015 | Kodde | |
| 2015/0095648 A1* | 4/2015 | Nix | H04L 9/0894 713/170 |
| 2016/0174178 A1* | 6/2016 | Nistor | H04L 63/00 370/503 |
| 2018/0241811 A1* | 8/2018 | Chen | H04L 67/1012 |
| 2018/0310301 A1* | 10/2018 | Amini | H04L 1/18 |
| 2021/0144097 A1* | 5/2021 | Li | H04L 43/026 |

* cited by examiner

BROKERLESS RELIABLE TOTALLY ORDERED MANY-TO-MANY INTERPROCESS COMMUNICATION ON A SINGLE NODE THAT USES SHARED MEMORY AND MULTICAST

BACKGROUND

Many applications utilize existing intra-process asynchronous publish and subscribe messaging. In computer networking, multicast is a type of group communication where data transmission is addressed to a group of destination computers or processes simultaneously. The most common transport layer protocol to use multicast addressing is user datagram protocol (UDP). With UDP multicast, computer applications can send messages with data to other hosts on an interne protocol (IP) network. UDP multicast has no guarantee of messaging delivery. UDP is the most common transport layer protocol to use multicast addressing. However, messages may be lost or delivered out of order, even if communication is within the same machine. There is nothing in the UDP protocol to prevent this.

Problems exist with migrating the existing intra-process messaging mechanism to inter-process with minimum intrusion and changes to the existing codebase. In one such solution, a centralized broker, such as a messaging bus, can manage messaging between processes to ensure the messages are received. However, using a centralized broker can lead to shortcomings. Most notably, the broker can create bottlenecks and introduces a new centralized risk that can cause messaging between processes to fail. More specifically, if the broker process crashes or is not running, messaging will be unavailable. This can directly lead to lost data for threads that are otherwise still functional.

As an example, a Host Daemon on a hypervisor is a monolithic binary comprised of separate modules that communicate via intra-process asynchronous messaging. A problem in one module can bring the entire system down. Many existing intra-process designs have a central entity that is the channel manager. The channel manager is aware of all channels and is the mediator that decouples channel readers and channel writers and provides ordering guarantees. This design is not straightforward for use in a brokerless inter-process communication. If the channel manager crashes this can break the remaining processes. A reader process may miss a message without any notice that this has happened or any way to handle missing the message. Additionally, if the readers do not read the messages in the same order, then various errors can occur.

Separating these modules into processes brings additional challenges. It has so far been unclear how to migrate the existing intra-process messaging mechanism to inter-process with minimum intrusion and almost no changes to the existing codebase. Rather than completely rewriting code that uses messaging in each application, to avoid incompatibility issues it is desirable to migrate to a distributed peer-to-peer messaging system where existing applications can continue using the same messaging interface with a distributed implementation. For example, if processes are already programmed to utilize multicast, then a lot of work must be done to redesign these processes to instead use a distributed peer-to-peer messaging system. Therefore, applications may need to use the same messaging interface where possible.

Other existing approaches fall short of providing brokerless, reliable, and totally-ordered many-to-many messaging. For example, a network protocol such as Pragmatic General Multicast (PGM) is not totally ordered from different writers and really can only be used with a single writer. The LMAX Disruptor messaging data structure is also not suitable because if a communicating process crashes between a claim and a commit, all other processes will wait for the commit and communications will break. The Unix Domain Sockets (UDS) protocol is reliable and ordered but does not have multicast.

As a result, a need exists for systems and methods that allow for a totally ordered many-to-many reliable multicast on a single node.

SUMMARY

Examples described herein include systems and methods for messaging between processes in a single node using a totally ordered many-to-many reliable multicast protocol. The architecture can be brokerless and provide many-to-many publish-subscribe inter-process messaging. The messaging system can run on top of a simple, reliable, and totally ordered many-to-many multicast protocol on a single node, unlike normal network multicast that pertains to multiple different nodes on the network. The protocol stack of the systems and methods can use multicast within one host and can be used in a way that is both reliable and provides total order. The systems and methods can be applied to products that isolate features in separate processes on the same machine. In one example, an application can be split into multiple processes, with readers and writers being used to transfer messages between the processes. Alternatively, the readers and writers can correspond to processes of different applications.

To facilitate these communications at the single node, the protocol can provide a reliable many-to-many multicast between the readers and writers. This can be a brokerless publish and subscribe solution that allows all readers to see the messages, but filter based on the messages that are relevant to the respective reader. The protocol can combine both shared memory and UDP multicast such that a data plane runs in one and a control plane runs in the other. The data plane transfers data whereas the control plane includes control messages, such as to request data or to report that data was missed. By using UDP multicast for one of these planes and shared memory for the other, the system can establish an ordered and asynchronous messaging protocol.

Either of the two approaches to the messaging protocol can be utilized for facilitating communications between reader and writer processes executing on a single node. In one example, the data plane runs on the UDP multicast protocol, and the control plane operates in shared memory. The system can store some data about the messages in the shared memory to order the messages, guaranteeing total ordering. Alternatively, the UDP multicast and the shared memory serve opposite roles, with the data plane using shared memory and the control plane using UDP multicast. Either combination of shared memory and UDP multicast can allow readers to read the messages in order without risk of communications failing upon failure of any one reader or writer.

Using the first version of the messaging protocol, which includes shared memory for the control plane, a writer process of an application can write a message with data that gets sent via datagram to all readers when one reader requests the message. In more detail, the writer can increase a sequence identifier (also referred to as "SID") in shared memory. The sequence identifier can be used to maintain an order to messages, since the messages themselves may be received out of order by a reader of an application (the same or different application). The message itself can be written to a seed buffer, which can be maintained by the writer. The seed buffer can associate the sequence identifier with the message. The writer also updates a message position field in the shared memory. The message position field can indicate the maximum number of messages or the maximum sequence identifier. Readers can access the message position field and thereby recognize when new messages exist.

Multiple readers can monitor the message position field and recognize when it differs from a prior copy of that field stored by the reader. For example, if the message position field includes a value that is multiple messages ahead of what the reader has seen, the reader can request one or more of those missing messages. To request the message, the reader writes the sequence identifier to a request buffer in the shared memory. The request buffer can be a ring buffer, in an example.

The writer and other writers can all monitor the request buffer. When the writer detects the sequence identifier in the request buffer, the writer can look up the message data in its seed buffer that corresponds to the sequence identifier. Then the writer can send a datagram to the reader using UDP multicast to relay the message data. However, if a reader does not receive the data, it can again place the sequence identifier in the request buffer to cause the writer to resend the data using the UDP multicast. Based on sequence identifiers, the reader can also recognize when it has received the messages out of order. In that situation, the reader can reorder the messages and request missing messages prior to reading the messages in a corrected order.

Alternatively, using the second version of the messaging protocol, which includes shared memory for the data plane, a writer process can write a message with data that gets stored in shared memory for reader consumption. Writing to a ring buffer of message data in the shared memory can be governed by a robust futex, which can be an operating system primitive that allows for providing locks that are robust. As used herein, the term robust futex can alternatively apply to a robust mutex, which likewise can be a locking primitive used by the operating system. The provided futex is robust because the kernel of the OS can recognize when the owner (e.g., the writer) of the futex exists prematurely, such as because of a crash. In that case, rather than the futex remaining locked such that no other writer can acquire it, the futex can be given to the next writer but also marked such that the next writer understands that the previous writer errored during its write.

With access to the futex, the writer can write the message to the ring buffer in the shared memory. After the message is written, the writer can update a message position in the shared memory and, finally, release the futex. By releasing the futex last, a failure to release the futex can be taken to mean that the writer failed during the write process. In effect, the robust futex allows only one process at a time to write to a counter position in the ring buffer. The robust futex can deal with crashes while holding a lock. If a process exits prematurely while holding a lock that is also shared with some other process, then waiters for or acquirers of that lock can be notified that the last owner of the lock exited in some irregular way.

After writing one or several instances of message data to the ring buffer, the writer can send a datagram using UDP multicast to notify readers of the existence of the message. The reader can receive the datagram and read up to the message position in the shared memory. The reader can start reading where it last left off. Each reader can maintain a stream position both in-process and duplicate it in the shared memory to indicate a last read position by that reader. The reader can read from the stream position to the message position based on receiving the datagram.

The ring buffer in the shared memory can be written to by a plurality of writer applications including the writer. However, the ring buffer can be read only with respect to a plurality of reader applications including the reader. A message can be appended to the message stream of the ring buffer by copying the message to the shared memory and increasing a position counter. When the message data cannot fit at the message position, the writer can add a padding message at the end of the ring buffer with the message at the front of the ring buffer. The readers can ignore the padding message.

If a writer has crashed before updating the counter position, its message can go unseen by readers and is overwritten by the following writer. All readers can see all messages from all writers in the same order, in an example. If a reader misses a message, the reader can know that it missed the message and take action.

Either approach to the messaging protocol can provide safety against individual processes that terminate. Unlike in a brokered process, if a reader or writer process crashes, communications can continue without that crashed process. Reader processes can each maintain a stream position. When reading, each reader can get the message from the stream position up to the stream end.

The readers and writers can alternatively be referred to as reader and writer applications, channel writers, and channel readers. It is to be understood that a single application can include multiple threads or parts, and that a reader or writer can be a subpart of an overall application.

Either approach to the protocol addresses the problem of migrating existing intra-process asynchronous publish/subscribe messaging mechanisms to inter-process on the same machine. The messaging mechanisms can require minimum intrusion to the existing codebase but can be extrapolated to any such system that desires to run a reliable totally ordered many-to-many multicast communication without a broker on single node. On one hand, the existing intra-process mechanism decouples completely many publishers from many subscribers, except for the topic, and provides topic hierarchy and message ordering within a topic by maintaining in-process state. On the other hand, putting this messaging service in a centralized broker would more likely become a bottleneck and a new risk to manage. Both versions of the messaging protocol allow for distributing the messaging between several peer processes.

The systems and methods herein provide termination safety by distributing information in such a way that no central broker or process can crash all messaging. When a reader misses a message, the reader can re-request it. All readers of a channel can see the same messages in the same order. Although it is not always the case that multiple processes will be publishing on the same channels, existing interfaces such as ChannelManager do allow for this. Moreover, the methods can also apply to messages posted to different channels by different processes. In general, the readers in the system can see the messages from all writers in the same order.

The examples herein provide minimal primitives and information needed by the use cases while leaving complex functionality (e.g., security, serialization, deserialization, etc.) to higher-level abstractions.

The examples can also apply to a non-transitory, computer-readable medium including instructions for carrying out the example methods described herein. The instructions can be executed by a processor, causing the processor to perform stages of the examples. A system can also execute according to the examples.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Figure 1A:
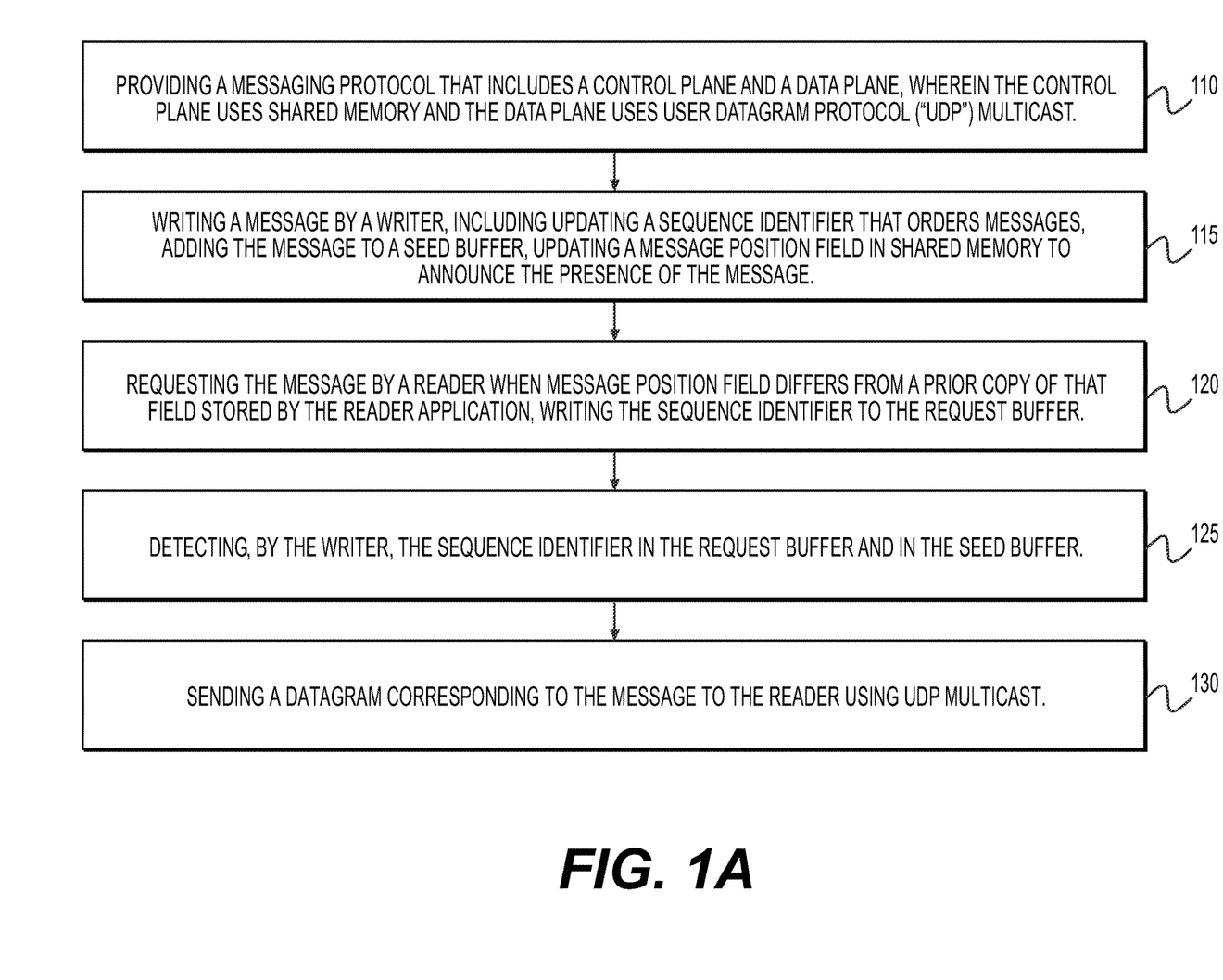
FIG. 1A is a flowchart of an exemplary brokerless many-to-many messaging process that can run on one node.
Figure 1B:
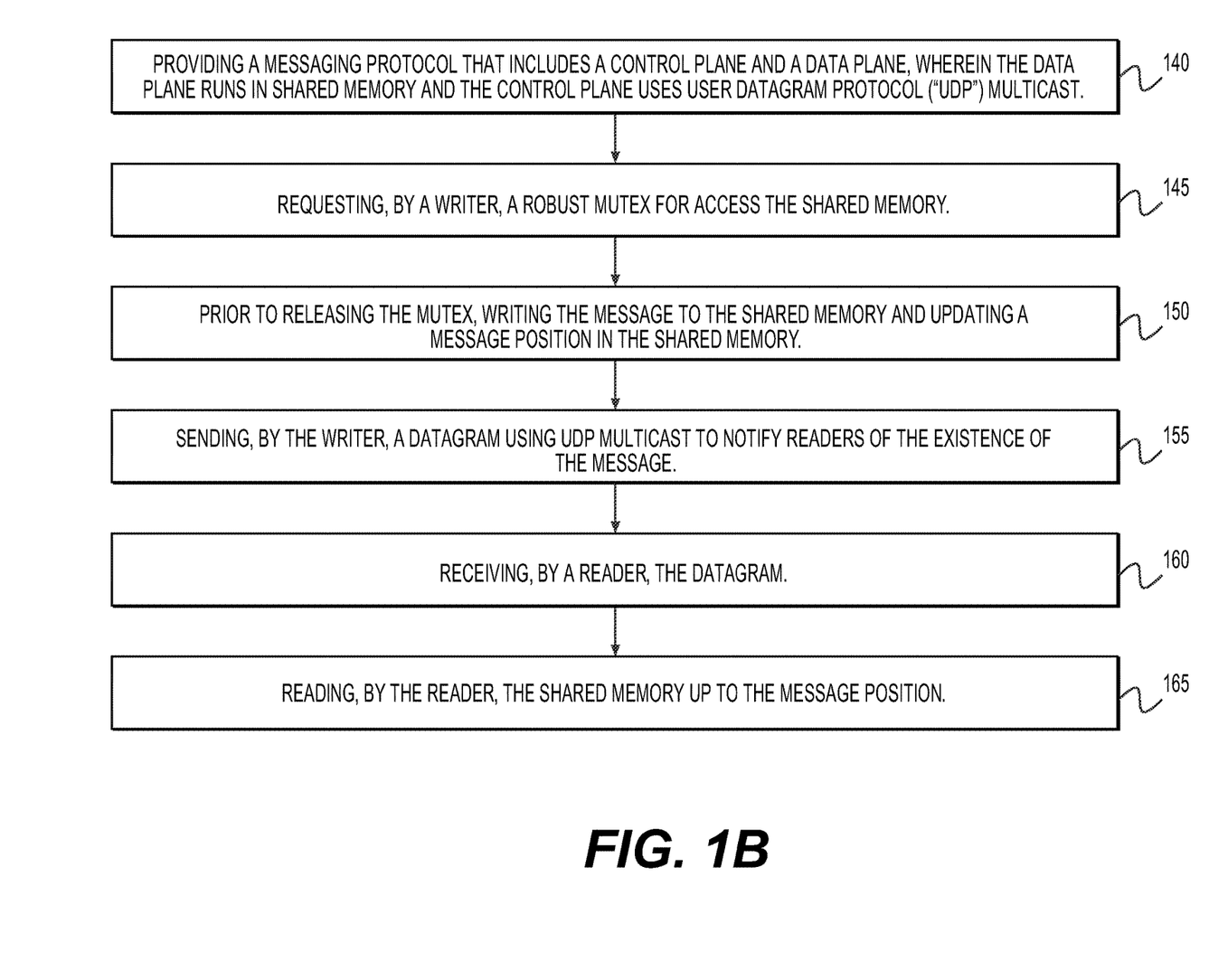
FIG. 1B is a flowchart of an exemplary brokerless many-to-many messaging process that can run on one node.
Figure 2:
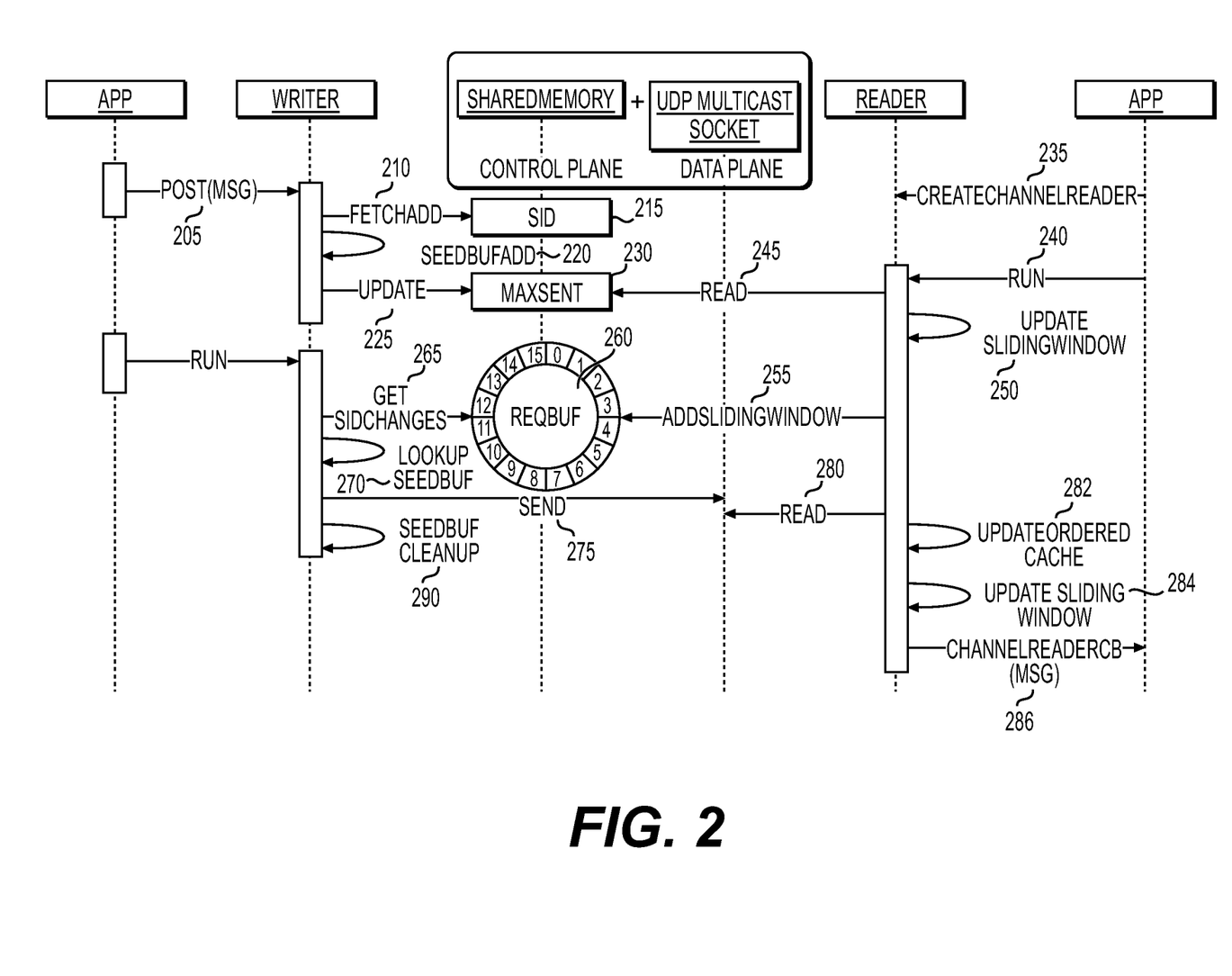
FIG. 2 is an exemplary sequence diagram for an exemplary brokerless many-to-many messaging process that uses shared memory for a control plane.
Figure 3:
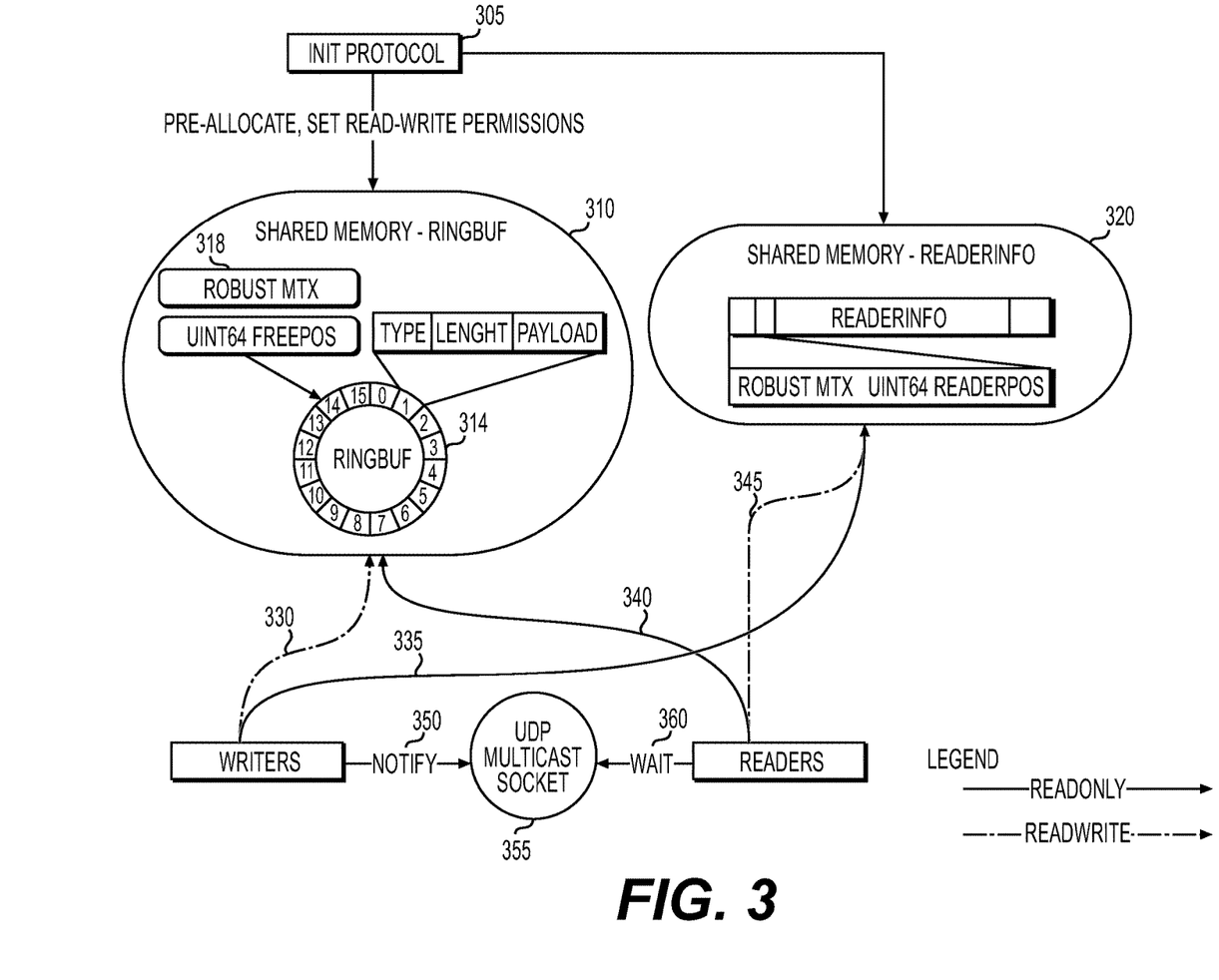
FIG. 3 an exemplary flow chart for a brokerless many-to-many messaging process that uses shared memory for a data plane.
Figure 4:
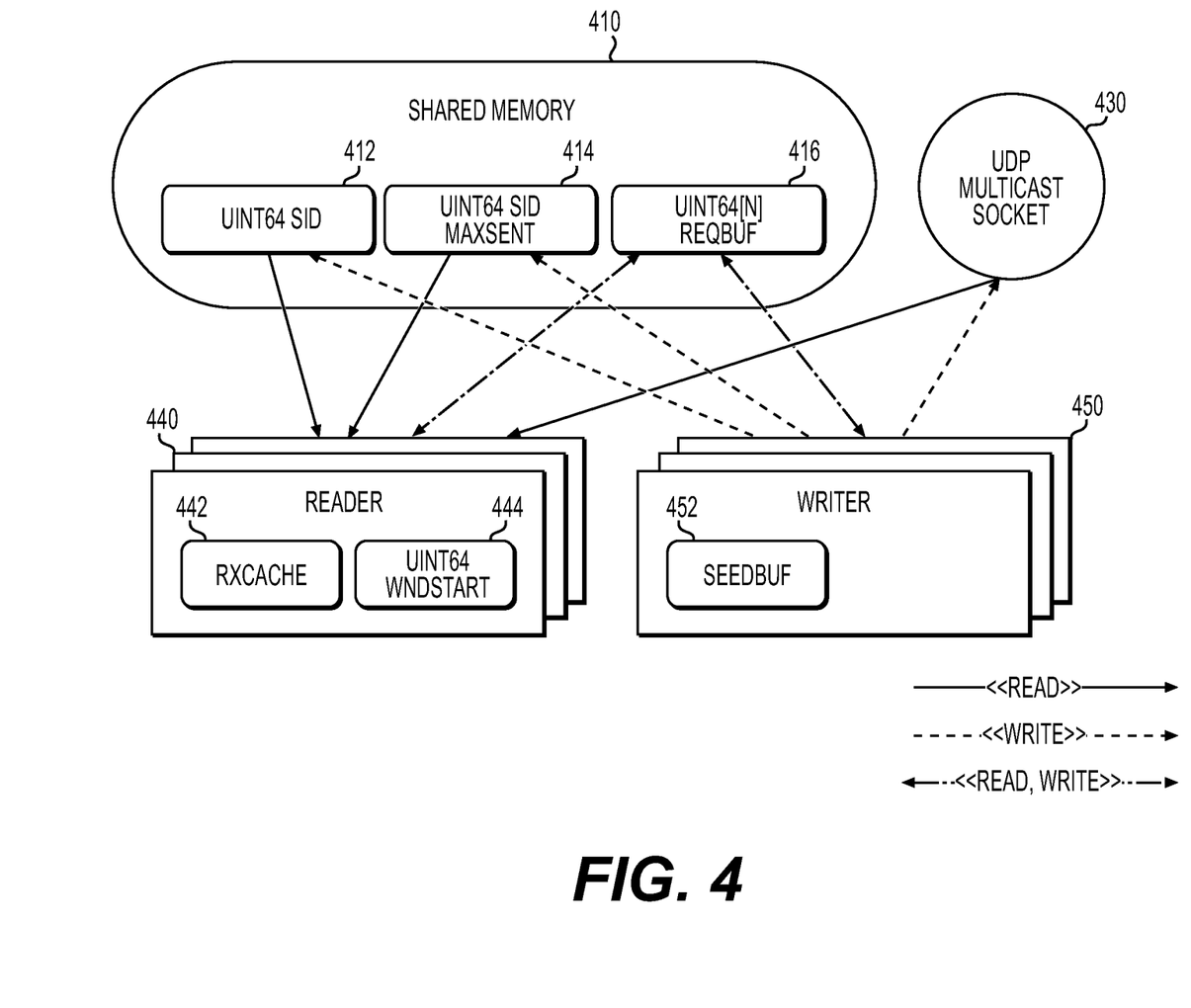
FIG. 4 is an exemplary illustration of system components for a brokerless many-to-many messaging process.
Figure 5:
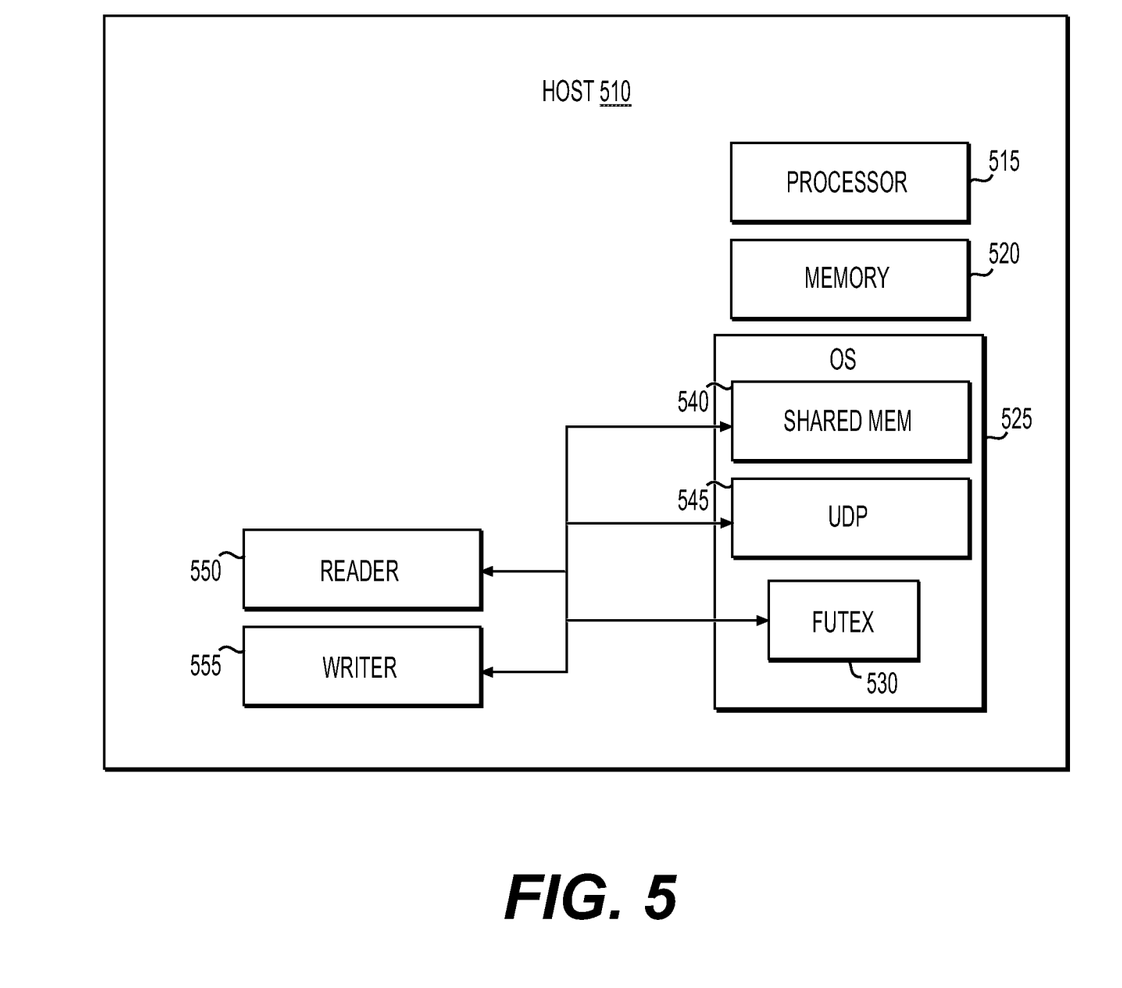
FIG. 5 is an exemplary illustration of system components for a brokerless many-to-many messaging process.

Examples described herein include systems and methods for inter-process asynchronous publish and subscribe messaging on a single node (e.g., on the same machine). A messaging protocol is provided that uses shared memory for one of a control plane and a data plane and UDP multicast for the other. FIGS. 1A, 2, and 4 relate to a protocol that utilizes shared memory for the control plane and UDP multicast for the data plane. FIGS. 1B and 3 relate to a protocol that utilizes shared memory for the data plane and UDP multicast for the control plane. FIG. 5 illustrates example system components.

FIG. 1A is a flowchart of an exemplary brokerless many-to-many publish and subscribe process that can run on one node. At stage 110, a node can provide a messaging protocol that includes a control plane and a data plane. The node can be any physical device with a processor, such as a host computer. In the example of FIG. 1A, the control plane uses shared memory and the data plane uses UDP multicast. Control messages are stored in the shared memory and the data related to those messages is broadcast from writers to readers using UDP multicast. The shared memory can be a section of physical memory on the node. For example, the shared memory can be of fixed length and comprise unsigned int64 fields. The shared memory can also include a message position field and a SID field. The SID field can allow for keeping track of the order of datagrams, whereas the message position field can indicate the latest seeded datagram in the system. Said another way, the message position field can track the stream end. The shared memory is discussed in greater detail later with regard to FIG. 4.

A dedicated process at the node can create and initialize the shared memory with the message position field and an SID field. In one example, the process can be part of an application that also includes the readers and writers as separate application processes.

Using the protocol provided at stage 110, writers can send messages to readers. The terms reader and writer can refer to the process that runs a ChannelManager instance, in an example. ChannelReader and ChannelWriter are instances created by ChannelManager. The terms channel, channel name, and topic can be used interchangeably. The writer is alternatively referred to as a "writer application" or "writer for an application" and can be a process that is part of a larger application executing at the node. The reader likewise can be referred to as a "reader application" or "reader for an application" but can be part of the same or different application as the writer, though operating as a different module or thread.

At stage 115, a writer can write a message. In the example of FIG. 1A, writers post the message without sending it to readers right away. Instead, the writers perform a two-step seed. The first step is to use the shared memory SID field to number datagrams associated with the message and put those datagrams in the respective writer's in-process seed buffer (referred to as "SeedBuf"). The seed buffer can be maintained outside of the shared memory by the writer. As the second step, the writer updates the message position (referred to as "maxSent") to announce the latest seeded datagram in the system. The message position can be maintained in the shared memory such that it is directly readable by reader processes. Datagrams stay in the seed buffer for a fixed amount of time.

When readers detect that a new datagram was published, the readers can request it at stage 120. The reader can detect a new datagram based on the message position field differing from a prior copy of that field stored by the reader. The prior copy allows each reader to keep track of its last read position. When the message position exceeds the last read position, this means the reader needs to request and read additional messages.

To request one or more messages, the reader can write the SID(s) of the message(s) to the request buffer (called "ReqBuf") in shared memory. The request buffer can be writable by the reader. The writer can monitor the request buffer for SIDs in its seed buffer.

At stage 125, the writer can detect the SID in the request buffer. The writer can recognize this as a request to broadcast the datagram corresponding to that SID. The writer can access the datagram in its seed buffer by matching the SID from the request buffer to the stored SID in the seed buffer.

Then, at stage 130, the writer can send the datagrams found in their seed buffer corresponding to the SID and reset the value in the request buffer. The datagrams can be sent using UDP multicast as the data plane. Readers can listen for the datagrams and receive them using UDP multicast.

If a reader misses the datagram, it can again add the SID to the request buffer according to stage 120. The writer can then repeat stage 125. Writers send a datagram only once for duplicate requests in some embodiments.

In one example, the process utilizes atomic wait-free word reads and writes in the shared memory. This can further ensure that the process can tolerate crashes of readers and writers. Additionally, the request buffer can be a ring buffer that allows state request data to eventually be overwritten. It may also contain obsolete data. In some systems, readers can repeat their requests.

FIG. 1B is a similar example flow chart that instead uses a protocol that is opposite that of FIG. 1A in some ways. In FIG. 1B, the data plane runs in shared memory and the control plane utilizes UDP multicast. The flowchart sill includes steps for an exemplary brokerless many-to-many publish and subscribe process that can run on one node.

At stage 140, the physical device of the node provides a messaging protocol that includes a control plane and a data plane. Again, unlike in FIG. 1A, in FIG. 1B the data plane runs in shared memory and the control plane uses UDP multicast.

A dedicated process at the node can create and initialize the shared memory with message ring buffer and reader stream positions. In one example, the process can be part of an application that also includes the readers and writers as separate application processes.

As will be described in more detail later for FIG. 3, the shared memory can include a ring buffer for writing messages and reader info for tracking the stream position of the readers. The writers can read and write to the ring buffer, whereas the readers can only read from it, in an example.

Using the protocol provided at stage 140, a writer can write a message to the ring buffer of the shared memory. The ring buffer can be protected by a robust futex, which includes a type of lock that is needed for writing to the next message position in the ring buffer. Only one process can own this lock at a time.

Therefore, before writing the data to the ring buffer, the writer first requests the robust futex at stage 145. The robust futex is a type of lock that safeguards against crashes that occur when a writer owns the futex. For example, the futex can be a 32-bit lock variable field that ensures only one writer writes at a single time to the message position of the ring buffer. Unlike a normal futex, the robust futex can have built in safeguards against a process crashing while owning the futex, which could normally result in other writers being locked out of writing to the ring buffer while waiting for write completion by the crashed writer. For example, if the writer were to crash with a normal futex-based lock, a system reboot may be required to release the lock (i.e., the futex).

The robust futex can be a primitive that operates in the kernel of the operating system of the node. The kernel can mark which process (e.g., writer) owns the futex. If the process crashes, the marked futex can still be obtained by a second writer. In one example, the kernel marks the futex when it detects the writer controlling the futex has crashed. The next writer that is granted the marked futex can recognize that the prior writer crashed, allowing for certain data recovery advantages. Generally, the terms "robust futex" and "robust mutex" are used interchangeably herein and reference a lock with crash protections based on the kernel tracking which process owns the lock.

At stage 150, while the writer owns the futex and prior to releasing it, the writer can write the data portion of the message to the shared memory. Then the writer can also update a message position field in the shared memory. This will cause a future writer operation to not write over the data that the writer just added to the ring buffer.

Upon completion of the write, the writer can release the futex. Releasing the futex after the write operation completes allows for better crash resilience. This is because the next writer will know whether the prior one did not actually complete the write operation if the futex is marked by the crashed writer rather than released as normal.

At stage 155, the writer can then use UDP multicast as a control plane by sending a datagram to a multicast address to notify readers of the existence of the message. The datagram itself can be a dummy datagram with no real information in an example. Alternatively, the datagram can have some minor amount of information, such as the message position. Alternatively, the datagram can be sent after writing several messages.

At stage 160, the reader can receive the datagram, which notifies the reader of the presence of a new message at the ring buffer. This can cause the reader to read the ring buffer up to the stream end and receive the data associated with the writer's message. The stream position can act as an index on the ring buffer. Each reader can have an in-process stream position and access the ring buffer wait-free. The reader can read a message from the stream by copying it from the shared memory.

After copying the message, the reader can check if the stream end position has overrun the reader's stream position in terms of ring buffer index. If so, the reader can pessimistically assume it has missed an unread message. Pessimistically means the reader may not have missed a message, such as an overrunning message appended to the ring buffer that occurred after the copying but before the checking. If not, then there is a certainty that no message has been lost.

By using the reader's stream position to read the ring buffer up to the stream end, all readers should see all messages in the same order. The system can limit the number of readers to a predefined maximum, with each assigned a stream position. Each reader's stream position can be stored both in the reader process and duplicated in shared memory. This can allow the writer to check on each reader's stream position and pause writing at stage 150 if it is getting a threshold number of positions in front of a reader.

Each stream position can also be protected by a robust futex. The associated futex can be acquired by the reader when the reader process starts and released when the reader process exits. While acquired, the robust futex cannot be assigned to another reader. Should a reader crash, other readers can re-acquire it.

Using the approach of FIG. 1B, necessary information is in shared memory and none is in the UDP message. Readers are insensitive to what data is in the UDP message. Thus, readers can wait for a notification and be CPU-friendly without sacrificing latency.

FIG. 2 is an exemplary sequence diagram for an exemplary brokerless many-to-many messaging process that uses shared memory for a control plane. Generally, FIG. 2 corresponds to the protocol and method discussed for FIG. 1A. The shared memory can be used as a control plane, whereas the UDP multicast is used for a data plane. A separate process can initialize the shared memory, including a sequence identifier field called SID at stage 215, a message position field called MAXSENT at stage 230, and a request buffer that can be a ring buffer at stage 260.

This protocol can employ both (1) unreliable or unordered multicast as data plane and (2) shared memory for total order and loss detection as a control plane. This provides a protocol for brokerless, reliable, totally ordered, many-to-many multicast on a single node in user-space. The protocol can also provide termination safety by placing simple wait-free and lock-free word-sized fields in the shared memory. The protocol uses client-based reliability in that clients are the active party to request missing and new messages.

At stage 205, an application can post a message. The message can be any data that needs to be transferred to another application or to some separate thread of the same application. The message destination is at the same node (i.e., hardware device). In FIG. 2, the two instances of "APP" can indicate the same application or different applications at the node. Posting the message includes sending the message to a writer process for communicating to one or more readers.

At stage 210, the writer can update the sequence identifier (also called SID) field. The SID field can be a counter that the writer increments and at any given time the SID field can indicate the current SID to use for a new message. The writer can atomically fetch the current SID value, increment it, and apply the new SID value back to the SID field. This ensures that the writer or even multiple writers will use an ordered SID that allows for keeping messages in order. Since it is possible for the readers to receive messages out of order when using UDP multicast as the data plane, the SID can allow for correctly reordering the received messages in those instances.

In one example, the SID field can be a uint64 field in shared memory for total ordering. At stage 210, the SID field can be atomically increased wait-free by publishers using x86 fetch-and-add and used by subscribers to order messages.

At stage 220, the writer can place the message in an in-process seed buffer. For example, the data for the message can be maintained by the writer rather than stored in shared memory like in FIGS. 1B and 3. The in-process seed buffer can associate the message data with the SID for later lookup and retrieval.

At stage 225, the writer can update a message position field in stored memory. In this example, the message position field is labeled "MAXSENT." The updated message position field can indicate the latest SID that has been sent. In one example, the writer updates the message position field by setting it to the maximum of SID and MAXSENT. In other words, if the SID is 5 and 4 messages were previously sent, MAXSENT can be set to 5.

One option is to have a uint64 MAXSENT field in shared memory that is updated by publishers (writers) in a lock-free (CAS-loop) way with the latest message in the system. Readers can have a copy of that field and use the latest value from shared memory request to new messages.

A different application process can create a channel reader at stage 235. The channel reader listens for UDP broadcasts on the channel. The reader can begin to run at stage 240.

The reader can read the message position field (e.g., MAXSENT) at stage 245. Each reader can also maintain a prior copy of that field called "SLIDINGWINDOW" in this example. The prior copy can be maintained in-process by the reader and allows the reader to remember where it left off reading messages. For example, if the message position is 5 but the prior copy is only 3, this means the reader still needs to read messages with SIDs 4 and 5.

The reader can increment the prior copy at stage 250 and add that SID value to a request buffer called REQBUF in shared memory at stage 255. The reader can repeat these stages until the prior copy SLIDINGWINDOW equals the message position MAXSENT. For example, this can cause the reader to add SID values 4 and 5 to the request buffer at stage 255. The request buffer can be a ring buffer that update the prior copy at stage 250 but also add the SIDs to the request buffer.

Requesting messages can be achieved by adding the SID to the request buffer (REQBUF) in shared memory. The REQBUF can be a ring buffer that includes a uint64 position counter in shared memory. The REQBUF is read by publishers (writers) in their duty cycle. As illustrated in FIG. 2, the writers can read what messages to send via UDP and reset that value of the REQBUF when the message is sent. However, another option is to avoid MAXSENT at the cost of readers requesting messages not present yet in the in-process seed buffer. Another option is to use the ring buffer where each reader announces the first missing message SID. Writers can use that information to send some number of messages from that SID on.

In the example of FIG. 2, the writer can periodically check for updates to the request buffer and get changes at stage 265. The changes can include new SID values, such as 4 and 5, that were inserted by one or more readers at stage 255. Using the SID, the writer can look up the corresponding message in the seed buffer at stage 270.

The writer can then send the message as a datagram at stage 275 using UDP multicast. This can include establishing or using an established a UDP multicast socket with the reader channel in an example. After sending the message, at stage 290 the writer can also use timers to prune the seed buffer when entries have existed for a threshold amount of time. This can allow for rebroadcasts for a period of time when datagrams are missed by readers and a reader re-requests the message by adding the SID to the request buffer again at stage 255.

The reader can listen for datagrams and read the message at stage 280. The reader can insert the message into a proper order by updating an ordered cache of received messages at stage 282. For example, if the reader receives message 5 but has not received message 4, the reader can store message 5 in the cache and re-request message 4 by adding that SID to the request buffer again at stage 255. This can ensure that the reader passes received messages to the application in order at stage 286. Readers can also use timers to predict when they have missed a datagram and therefor are missing a message.

Likewise, at stage 284 the reader can update the prior copy of the message position field to indicate that the particular SID was received. This can prevent the reader from requesting a message that it has already received.

This iteration of the reader duty cycle can then end. The next iteration of the reader duty cycle can start again at stage 245.

FIG. 3 provides an exemplary flow chart for a brokerless many-to-many messaging process that uses shared memory for a data plane. FIG. 3 corresponds to the protocol and method discussed for FIG. 1B. The data plane can use shared memory while the control plane relies on UDP multicast.

At stage 305, a separate process can initialize the protocol by pre-allocating shared memory structures and setting read and write permissions. The protocol can use a segment of shared memory that is pre-allocated and pre-initialized with robust data structures protected by robust futexes. Each communicating process can run a library that writes or reads messages to and from the shared memory according to an established protocol. The protocol can incorporate a many-to many inter-process notification mechanism, such as UDP multicast, to achieve reasonable latency and CPU efficiency. For example, latency can be sub-millisecond.

One approach to stage 305 is to pre-initialize shared memory with a dedicated process. Once the shared memory segment is initialized, writers and readers can start communication. This can include creating a message ring buffer and reader stream position fields in the shared memory. Necessary read and write permissions can also be set. For example, the writers can have read and write privileges on the ring buffer whereas the readers can only read the ring buffer.

In one example, the ring buffer and reader info are in separate shared memory segments. Writers can have read-write permissions for the ring buffer shared memory segment to post a message. This means that only writers can post a message. Readers, on the other hand, can have read permissions for the ring buffer shared memory segment, allowing the readers to only read messages. Readers cannot post messages in that example.

For the READERINFO portion of shared memory, readers can be assigned read-write permissions. This can allow each reader to indicate its stream position in shared memory. The writer can read this information and temporarily pause writes if it is getting a threshold number of messages out in front of a reader. To ensure one reader cannot trick another into missing or repeating messages, each reader can also keep an in-process stream position and use it to retrieve new messages, and update READERINFO with it.

In one example, no initializer process is needed to initiate the protocol at stage 305. Instead, the first communicating peer process that creates the shared memory segment can (1) initialize the shared memory and (2) set a flag so the other processes can tell whether the shared memory is initialized. If the initializing process fails between (1) and (2), communication cannot happen. However, the instruction window between (1) and (2) can be small, such as part of the application initialization phase.

The initialization of shared memory at stage 310 can also include initialization of a robust futex at stage 318. The robust futex can deal with crashes while holding a lock. If a process exits prematurely while holding a lock that is also shared with some other process, then the operating system ("OS") can notify waiters for that lock that the last owner of the lock exited in some irregular way.

The shared memory can also include a ring buffer ("RINGBUF"). An infinite stream of arbitrary length messages can be mapped onto the ring buffer in shared memory. As shown in FIG. 3, each message can start with a header with the message length and type. The stream end can be identified by a message position counter ("FREEPOS"), which can be an atomic int64 monotonically increasing message position counter in shared memory. The message position counter can be mapped (via modulo) to an index in the ring buffer. Unless otherwise stated, the terms message position and stream end are used synonymously.

At stage 330, a writer can begin a write. The write can include four steps. First, the writer can request the robust futex for accessing the ring buffer at stage 318. The robust futex is controlled by one writer at a time but is robust and handles crashed writers. Second, the writer can determine whether to pause writing (i.e., add backpressure) by checking the reader stream positions at stage 335. If the reader stream position (READERPOS) is within a threshold distance from the message position (FREEPOS), then no backpressure is needed. Third, when these conditions are met, the writer can copy its message to the message stream of the ring buffer. This can be accomplished by copying the message to the shared memory at a ring buffer index identified by FREEPOS (the message position) modulo the ring buffer size. If a message cannot fit starting at that index, a padding message can be added to the end of the ring buffer with the real message being at the front. Padding messages are ignored when reading.

Fourth and finally, the writer can then increase FREEPOS, which serves to commit the write and have future writes and reads use the next location. This operation is protected by the robust futex to honor the single-writer principle needed for race-free writing. If a writer crashes before updating FREEPOS, its message is not seen by readers and is overwritten by the following writer. A following writer that acquires the robust futex doesn't need to recover the ring buffer.

When the write of stage 330 is complete, the writer can release the robust futex. The operating system can track that the robust futex is no longer controlled by the writer.

At stage 350, the writer can notify the readers of the existence of the new message by sending a datagram using UDP multicast. This can include initiating a UDP multicast socket at or prior to stage 355 in an example. Additionally, the writer can delay the notification until several new messages are written.

To notify readers, writers can send a dummy UDP message (i.e., datagram) to a multicast address after FREEPOS has been updated. In the example of FIG. 3, all necessary information is in shared memory and none is in the UDP message. Readers are insensitive to what data is in the UDP message. Thus, readers can wait for a notification at stage 360 and be CPU-friendly without sacrificing latency. False notifications are not harmful since reading is idempotent. A reader can identify there is nothing to read. A reader can handle several new messages with one notification.

When the reader receives the datagram, the reader can check for the new message in the ring buffer. The ring buffer can be read-only for the reader. To begin reading in response to the notice of stage 350, the reader can get the messages from its last stream position up to the stream end of the ring buffer. Each reader maintains a stream position to indicate where it last finished reading. The reader can read this stream position from READERINFO portion of shared memory at stage 320. Alternatively, the stream position can be maintained in-process and copied to READERINFO for the purpose of backpressure.

The reader's access to the ring buffer can be wait-free. The reader reads a message from the stream by copying it from the current read position for that reader in the ring buffer at stage 314. After copying the message, the reader can check if the stream end position has overrun the reader's stream position (in terms of the index in the ring buffer). If it has, the reader can pessimistically assume a new message append may have happened before or during copy-reading, meaning there is at least one unread message that is lost. If no overrun occurs, then there is 100% certainty that no message has been lost. All readers can see all messages from the ring buffer in the same order.

At stage 345, each reader can update its stream position in the shared memory. This allows a writer to check at stage 335 to determine if it is outpacing a reader. If so, the writer create backpressure by momentarily pausing writing at stage 330. Each reader stream position can also be protected by a robust futex, in an example. The robust futex can be acquired when a reader process starts and released when exits. Alternatively the futex can be acquired when ChannelManager is created and released when destroyed. While acquired, it cannot be assigned to another reader. Should a reader crash, other readers can re-acquire it. In the proposed invention, there is no process whose crash may affect the remaining communicating processes.

In one example, the reader keeps its stream position in its own process and only updates with it the shared memory for the purpose of backpressure. Thus, receiver-wise, one reader cannot corrupt the stream position of another reader.

Using the stream position, at stage 340 the reader can read data from the ring buffer of the shared memory up to the stream end (FREEPOS). This can include looping through the ring buffer so long as the incrementing reader stream position is not the same as FREEPOS. At each index of the ring buffer, the reader can copy the message header first. If the header type indicates a padding message, then the reader can skip the padding data as per the length field from the header. If the header type indicates a normal message, then the reader can copy the next length bytes (the message data) from the ring buffer. The reader can check if its stream position has been overrun after each copy of data from the ring buffer. The reader stream position can then increment and the reading can continue.

FIG. 4 is an example system diagram showing system components. Some of the details of this example are directed to the configuration for the protocol of FIGS. 1A and 2. Shared memory 410 can be fixed length and comprised of unsigned int64 fields, including an SID field 412, a position field (MAXSENT) 414, and a request buffer (REQBUF) 416. The SID field 412 can be a global monotonically increasing system counter to number datagrams used by writers 450. The SID value can be used to determine the datagram total order for protocols following FIGS. 1A and 2. Due to the semantics of this field 412 and available processor instructions, this field 412 can be accessed atomically in a wait-free way.

The position field 414 can also be a global monotonically increasing system counter used by writers to announce the latest seeded datagram in the system. For example, if two writers A and B want to update position field 414 with values 5 and 6 respectively, and the position field gets updated with 6 first, the position field 414 should remain at a maximum to prevent the value from becoming 5. For termination safety, the update operation can be lock-free. This can be achieved with a compare-and-swap ("CAS") loop. The position field 414 can updated once per message sent. The CAS-loop can stop if MAXSENT is greater than the new value. Furthermore, this operation can be relaxed into a wait-free operation using some descriptor-based technique.

In accordance with the examples of FIGS. 1A and 2, the request buffer 416 can be a ring buffer holding datagram SIDs. Readers can use the request buffer 416 to request datagrams from writers (i.e., seeders). Writers 450 and readers 440 see only the requested datagrams since their last check, in an example.

Access to the request buffer 416 can be wait-free. When the request buffer 416 becomes full, older requests are overwritten. The request buffer 416 may also return stale requests. In both cases, the readers 440 can repeat their request. The shared memory is created on demand by the first reader or writer to come and is of fixed size. This approach assumes it is zero initialized by the OS kernel. User-space initialization is unnecessary based on carefully choosing special unset/invalid values to be zero. In fact, user-space initialization is prone to produce inconsistent shared memory states if the initializing process crashes. For simplicity, the example implementation does not free the shared memory when the last reader or writer finishes.

Writers 450 can each maintain an in-process seed buffer (SEEDBUF) 452. When a message is posted, writers do not send it right away. Instead, they do a two-step seed. The first step can be to use the SID field 412 of the shared memory 410 to number datagrams and put them in their in-process seed buffer 452. As the second step, the writer 450 can update the message position 414 to announce the latest seeded datagram in the system. When readers 440 detect that a new datagram was published, they request the datagram. Datagrams can stay in the seed buffer 452 for a fixed amount of time.

Readers 440 can pull data from writers 450 by inserting SIDs into the request buffer 416. This way no data will be sent by writers 450 if there are no readers 440 in the system. Also, readers 440 can control the rate of data.

Readers can use a sliding window 444 (for requested but not received datagrams) for requesting the new datagrams. When a reader is created, the current message position (MAXSENT) 414 value is used as the start of the sliding window 444 (WNDSTART). After a sequence of datagrams is passed to the upper application layer by the reader 440, the sliding window 444 is advanced to the first datagram following the sequence (i.e., the first missing datagram). The sliding window 444 is populated with values that increment from the initial WNDSTART to MAXSENT but no more than a predefined size. A reader 440 can request datagrams by adding the SIDs from its sliding window 444 to the request buffer 416 in shared memory 410. When doing so, readers 440 can check the request buffer 416 for identical requests by other readers 440 so as to not repeat already requested datagrams. Each reader 440 removes the SID from its sliding window 444 when such datagram is received. There is also a time limit for SIDs in the sliding window 444, in an example. When the time limit expires, the reader 440 can send a timeout notification to the upper layer of the application.

Readers 440 can accept as input the unordered and unreliable delivery of UDP datagrams using the UDP multicast socket 430. As output, the readers 440 can produce an ordered sequence of datagrams or timeout events. To achieve this, they cache the datagrams that have been received in an in-process cache 442 (RXCACHE). When the cache 442 contains a sequence of datagrams with no gaps, the datagrams are passed to the upper layer in the correct order. The correct order can be determined by datagrams' SIDs. As the ordered datagrams are passed to the upper layer, the reader removes the datagrams from the cache 442. When a reader (e.g., ChannelReader) is created, the reader 440 can obtain snapshots of the SID field 412 from shared memory and use it to detect datagrams and timeouts that were created before creation of the reader 440.

FIG. 5 is an example diagram of system components on a single node. The node can comprise a host computer 510, which can be a physical machine having a processor 515 and memory 520. The memory 520 can be a non-transitory computer-readable medium containing instructions for implementing the messaging protocols and methods described herein. The host computer 510 can be one or more servers with one or more processors 515. Additionally, the host 510 can execute an OS 525. The OS 525 can include a kernel that manages a robust futex 530 primitive. The OS 525 can also manage UDP 545 and shared memory 540 in an example.

The readers 550 and writers 555 can all operate at the single node on the host machine 510. The shared memory 540 can be allocated within the memory 520 of the host, which can include random-access memory, solid-state memory, and the like. Likewise, the UDP multicast communications, while normally used in a networking environment, can all operate at the single node between the readers 550 and writers 555 on the host machine 510.

Other examples of the disclosure will be apparent to those skilled in the art from consideration of the specification and practice of the examples disclosed herein. Though some of the described methods have been presented as a series of stages, it should be appreciated that one or more stages can occur simultaneously, in an overlapping fashion, or in a different order. The order of stages presented are only illustrative of the possibilities and those stages can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for messaging on a physical device, comprising:
   providing, at the physical device, a messaging protocol that includes a control plane and a data plane, wherein the data plane runs in shared memory and the control plane uses user datagram protocol ("UDP") multicast;
   writing, with a writer for an application, a message to the shared memory, wherein the writing includes:
      requesting a robust futex for access to the shared memory, wherein a kernel marks the futex as acquired by the writer;
      with access to the futex, writing the message to the shared memory;
      after the message is written, updating a message position in the shared memory; and
      releasing the futex;
   sending, by the writer, a datagram using UDP multicast to notify readers of the existence of the message;
   receiving, by a reader, the datagram; and
   reading, by the reader, the shared memory up to the message position,
   wherein the reader stores its stream position in-process, and wherein the reader reads the shared memory from the stream position to the message position based on receiving the datagram.

2. The method of claim 1, wherein the shared memory includes a ring buffer comprising a stream of messages.

3. The method of claim 2, wherein a plurality of writers including the writer can write to the ring buffer, and wherein the ring buffer is read only for a plurality of reader including the reader.

4. The method of claim 1, wherein a stream position of the reader is stored in shared memory and read by the writer, and wherein the writer temporarily delays the writing when the stream position falls a threshold number of positions behind the message position.

5. The method of claim 1, wherein a second writer can acquire the futex when the writer crashed prior to releasing the futex, wherein the marking indicates to the second writer that the writer failed unexpectedly.

6. The method of claim 1, wherein prior to writing to the message position in the shared memory, the writer checks the stream position and stream positions of other readers to ensure the message position does not already reference an existing message not yet read by the reader or one of the other readers.

7. A non-transitory, computer-readable medium containing instructions that, when executed by a processor of a node, cause the node to perform stages comprising:
   providing, at a physical device, a messaging protocol that includes a control plane and a data plane, wherein the data plane runs in shared memory and the control plane uses user datagram protocol ("UDP") multicast;
   writing, with a writer for an application, a message to the shared memory, wherein the writing includes:
      requesting a robust futex for access the shared memory, wherein a kernel marks the futex as acquired by the writer;
      with access to the futex, writing the message to the shared memory;
      after the message is written, updating a message position in the shared memory; and
      releasing the futex;
   sending, by the writer, a datagram using UDP multicast to notify readers of the existence of the message;
   receiving, by a reader, the datagram; and
   reading, by the reader, the shared memory up to the message position,
   wherein a stream position of the reader is stored in the shared memory and read by the writer, and wherein the writer temporarily delays the writing when the stream position falls a threshold number of positions behind the message position.

8. The non-transitory, computer-readable medium of claim 7, wherein the shared memory includes a ring buffer comprising a stream of messages, wherein a plurality of writers including the writer can write to the ring buffer, and wherein the ring buffer is read only for a plurality of reader including the reader.

9. The non-transitory, computer-readable medium of claim 7, wherein the datagram is sent after multiple new messages including the message are written to the shared memory.

10. The non-transitory, computer-readable medium of claim 7, wherein the reader stores its stream position in-process, and wherein the reader reads the shared memory from the stream position to the message position based on receiving the datagram..

11. The non-transitory, computer-readable medium of claim 7, wherein a second writer can acquire the futex when the writer crashed prior to releasing the futex, wherein the marking indicates to the second writer that the writer failed unexpectedly.

12. The non-transitory, computer-readable medium of claim 7, wherein prior to writing to the message position in the shared memory, the writer checks the stream position and stream positions of other readers to ensure the message position does not already reference an existing message not yet read by the reader or one of the other readers.

13. A system for inter-process communication at a single node, the system comprising:
   a non-transitory, computer-readable medium containing instructions;
   a device that executes the instructions to perform stages comprising:
      providing a messaging protocol that includes a control plane and a data plane, wherein the data plane runs in shared memory and the control plane uses user datagram protocol ("UDP") multicast;
      writing, with a writer, a message to the shared memory, wherein the writing includes:
         requesting a robust futex for access the shared memory;
         with access to the futex, writing the message to the shared memory;
         after the message is written, updating a message position in the shared memory; and
         releasing the futex;
      sending, by the writer, a notification to notify readers of the existence of the message;
      receiving, by a reader, the datagram; and
      reading, by the reader, the shared memory up to the message position,
      wherein the reader stores a stream position in-process to indicate a last read position by the reader, wherein the reader updates the shared memory to indicate the stream position, and wherein the writer pauses writing based on the stream position in the shared memory.

14. The system of claim 13, wherein the shared memory includes a ring buffer comprising a stream of messages, and wherein the notification is a datagram sent using UDP multicast.

15. The system of claim 14, wherein, when the message cannot fit at the message position, the writing includes adding a padding message at an end of the ring buffer with the message following the padding, wherein the reader ignores the padding message.

16. The system of claim 14, wherein a plurality of writers including the writer can write to the ring buffer, and wherein the ring buffer is read only for a plurality of readers including the reader.

17. The system of claim 13, wherein an operating system of the node marks the mutex to indicate a crash of the writer, wherein a second writer acquires the marked mutex without waiting for the writer to complete the writing stage, the marking indicating to the second writer that the crash occurred.

* * * * *